US012054932B2

(12) United States Patent
Fokas et al.

(10) Patent No.: US 12,054,932 B2
(45) Date of Patent: Aug. 6, 2024

(54) WATERPROOF ELEVATOR PIT FLOOR AND METHOD OF INSTALLING SAME

(71) Applicant: Independence Materials Group, LLC, Virginia Beach, VA (US)

(72) Inventors: Jerome Fokas, Holmdel, NJ (US); Tommy Chechel, Cliffwood Beach, NJ (US); Jason Weaver, Keansburg, NJ (US); James Monge, Freehold, NJ (US); Daniel Ladjack, Keansburg, NJ (US)

(73) Assignee: Independence Materials Group, LLC, Virginia Beach, VA (US)

( * ) Notice: Subject to any disclaimer, the term of this patent is extended or adjusted under 35 U.S.C. 154(b) by 173 days.

(21) Appl. No.: 17/698,605

(22) Filed: Mar. 18, 2022

(65) Prior Publication Data

US 2022/0307254 A1 Sep. 29, 2022

Related U.S. Application Data

(60) Provisional application No. 63/166,992, filed on Mar. 27, 2021.

(51) Int. Cl.

*E03F 5/04* (2006.01)
*B66B 11/00* (2006.01)
*E04F 17/00* (2006.01)

(52) U.S. Cl.

CPC ............ *E03F 5/04* (2013.01); *B66B 11/0005* (2013.01); *E04F 17/005* (2013.01)

(58) Field of Classification Search

CPC ...... E03F 5/04; B66B 11/0005; E04F 17/005; E04B 1/7023; E02D 31/02
See application file for complete search history.

(56) References Cited

U.S. PATENT DOCUMENTS 4,311,052 A * 1/1982 Jeffras .................. G01N 29/265 901/44
5,794,388 A * 8/1998 Jackman ............... E04B 1/7023 52/302.1

(Continued)

FOREIGN PATENT DOCUMENTS

JP S6424704 U * 2/1989
KR 20070111440 A * 11/2007
KR 102579636 B1 * 9/2023

*Primary Examiner* — Theodore V Adamos

(74) *Attorney, Agent, or Firm* — Moore & Van Allen PLLC; Jeffrey R. Gray

(57) ABSTRACT

An elevator pit having a waterproof cement floor and method for installing the same. The elevator pit includes a jack casing and a drainage pit installed within the elevator pit. A trench is formed in exposed ground surface and defines a channel having a first end positioned at an area that is susceptible to water accumulation within the elevator pit and a second end terminating at the drainage pit. A perforated conduit extends within the channel with an end terminating at the drainage pit. A layer of gravel is disposed over the exposed ground surface and trench at a predetermined height to cover the perforated conduit. A layer of waterproof cement is provided over the ground surface at a predetermined height to cover the gravel, channel and perforated conduit to form the waterproof cement floor which extends across an entire periphery of the elevator pit.

20 Claims, 8 Drawing Sheets

(56) References Cited

U.S. PATENT DOCUMENTS

| | | | | |
|---|---|---|---|---|
| 6,543,189 | B1 * | 4/2003 | Wood, Jr. | E02D 31/008 52/302.1 |
| 8,186,127 | B1 * | 5/2012 | Pratt | E02D 31/02 52/302.1 |
| 8,590,213 | B2 * | 11/2013 | Scarfo | E04B 1/7023 52/716.2 |
| 8,820,013 | B2 * | 9/2014 | Fennell | E04B 1/7076 52/302.3 |
| 2011/0041426 | A1 * | 2/2011 | Trotter | E02D 31/02 52/302.6 |
| 2014/0227035 | A1 * | 8/2014 | Johnson | E21B 43/00 405/50 |
| 2014/0367477 | A1 * | 12/2014 | Cha | E04F 15/02464 52/126.6 |
| 2017/0089331 | A1 * | 3/2017 | Bialick | B66B 11/0005 |
| 2020/0063393 | A1 * | 2/2020 | Trebil | E04B 1/7023 |
| 2022/0120074 | A1 * | 4/2022 | Lepore | E02D 31/02 |

* cited by examiner

WATERPROOF ELEVATOR PIT FLOOR AND METHOD OF INSTALLING SAME

CROSS REFERENCE TO RELATED APPLICATIONS

This application claims priority to U.S. provisional application Ser. No. 63/166,992 filed on Mar. 27, 2021, the content of which is incorporated by reference in its entirety.

BACKGROUND OF INNOVATION

Field of Invention

The innovation relates generally to a water removal system. More particularly, the innovation relates to an elevator pit water removal system.

Related Prior Art

Elevator pits are provided in buildings and other structures to provide access into the bottom portion of an elevator shaft to enable installation and service of mechanical and hydraulic lift systems which enable an elevator car to ascend and descend at selected floors or levels in a well-known manner. Because the location of the elevator pit is typically beneath the ground level, the general presence of water in the surrounding ground/environment may lead to undesirable seepage into the elevator pit. As the cement floor of the elevator pit is generally porous and subject to continuous seepage from ground water, if the excess water is not removed from the elevator pit, the water may cause degradation to the pit flooring and the structural elevator components in the elevator pit, which can impact the integrity, longevity and safe operation of the building structure and elevator system.

U.S. Pat. No. 8,043,069 to Bialick et al. discloses that the ground water may exert hydronic pressure on the components of the building and, if not released, may cause damage to the building. One technique for removing water from an elevator pit involves placing a pump in the elevator pit. However, the pumps are electric powered and susceptible to power outages and failure. If the bottom surface is exposed to water leakage for prolonged periods, especially in colder regions, ice can form which can cause expansion and lead to cracks and openings in the flooring and building foundation, thereby further accelerating potential and permanent damage to the elevator floor and the components installed thereon.

An additional technique that has been utilized to prevent water from entering the elevator shaft is applying a waterproof coating to the walls and floor of the elevator shaft. While this technique may restrict water from entering the elevator shaft, this technique often fails due to hydronic pressure caused by water in the ground surrounding the elevator pit.

Because of building structures that surround an elevator pit, it is often not possible to excavate an area surrounding the elevator pit to install other water removal systems.

SUMMARY

The disadvantages heretofore associated with the prior art are overcome by the present invention of a waterproof elevator pit floor and method of installing same. In one embodiment, a method is provided for waterproofing an elevator pit having a cement floor on or through which an elevator assembly, e.g., jack casing, is mounted and a drainage pit is formed. The method comprises: trenching a bottom of the elevator pit to provide a channel having a first end positioned at an area susceptible to water accumulation within the elevator pit and a second end terminating at the drainage pit; inserting a perforated conduit within the channel such that an end of the perforated conduit terminates at the drainage pit; applying a layer of gravel within the channel at a predetermined height to cover the perforated conduit; and pouring a layer of waterproof cement at a predetermined height to cover the channel, gravel, and perforated conduit.

In one aspect, prior to said trenching step, is a step of removing a cement floor surface in the elevator pit to expose the ground surface thereunder. Preferably, the step of inserting the perforated conduit comprises pitching the conduit downward at a predetermined angle towards the drainage pit.

In another aspect, the step of inserting the perforated conduit comprises inserting perforated PVC piping into the channel. The step of inserting the perforated conduit can include laying a conduit having perforations that are preferably in a range of ⅜ to ⅝ inches. The step of inserting the perforated conduit can include laying a conduit having a quantity of perforations preferably in a range of 6 to 12 perforations per foot.

In another aspect, the step of applying a layer of gravel includes laying gravel having granularity preferably in the range of ½ to ¾ inches. The step of applying the layer of gravel can include laying at least one of pebbles and bluestone chip types of gravel over the ground surface and conduits.

In a further aspect, the step of pouring the waterproof cement includes pouring a layer of waterproof cement of approximately 2 to 4 inches. The pouring of waterproof cement can include pouring one of a WATERSTOP and XYPEX type of waterproof cement over the gravel and ground surface.

In one aspect, the method further comprises pumping out water accumulating in the drainage pit from the perforated channel at a predetermined water level in the drainage pit.

In another aspect, prior to the step of trenching the surface, the method includes excavating the elevator floor to expose a ground layer under the bottom of the elevator pit, wherein the step of trenching the bottom includes providing the channel in the exposed ground layer.

In still another aspect, prior to said pouring the layer of waterproof cement, the method further comprises the step of installing a gutter sleeve around a periphery of the elevator pit between a sidewall and the ground surface of the elevator pit. In one aspect, the step of pouring the layer of waterproof cement comprises pouring the waterproof cement to a predetermined height that is less than a maximum vertical height of the gutter sleeve.

In another aspect, the step of pouring the layer of waterproof cement comprises leveling the waterproof cement floor. Alternatively, the step of pouring the layer of waterproof cement comprises pitching the waterproof cement floor towards the drainage pit.

In another embodiment, an elevator pit having a waterproof cement floor is provided. The elevator pit comprises: an elevator assembly extending through the cement floor; a drainage pit provided in the cement floor. A trench is formed in a bottom of the cement floor and defines a channel having a first end positioned at an area that is susceptible to water accumulation within the elevator pit and a second end terminating at the drainage pit. A perforated conduit extends within the channel, wherein an end of the perforated conduit terminates at the drainage pit. A layer of gravel is disposed in the channel at a predetermined height to cover the perforated conduit, and a layer of waterproof cement is provided at a predetermined height to cover the gravel, channel and perforated conduit.

In one aspect, the perforated conduit is pitched downward at a predetermined angle towards the drainage pit. In another aspect the elevator pit comprises a gutter sleeve installed around a periphery of the elevator pit between a sidewall and a ground surface of the elevator pit. In a further aspect, a portion of the gutter sleeve extends above the waterproof cement floor. In yet another aspect, the perforated conduit comprises PVC piping. In still another aspect, the gravel has a granularity in the range of approximately ½ to ¾ inches.

BRIEF DESCRIPTION OF THE DRAWINGS

The invention will be further described below and with reference to the attached drawings in which.

Figure 1:
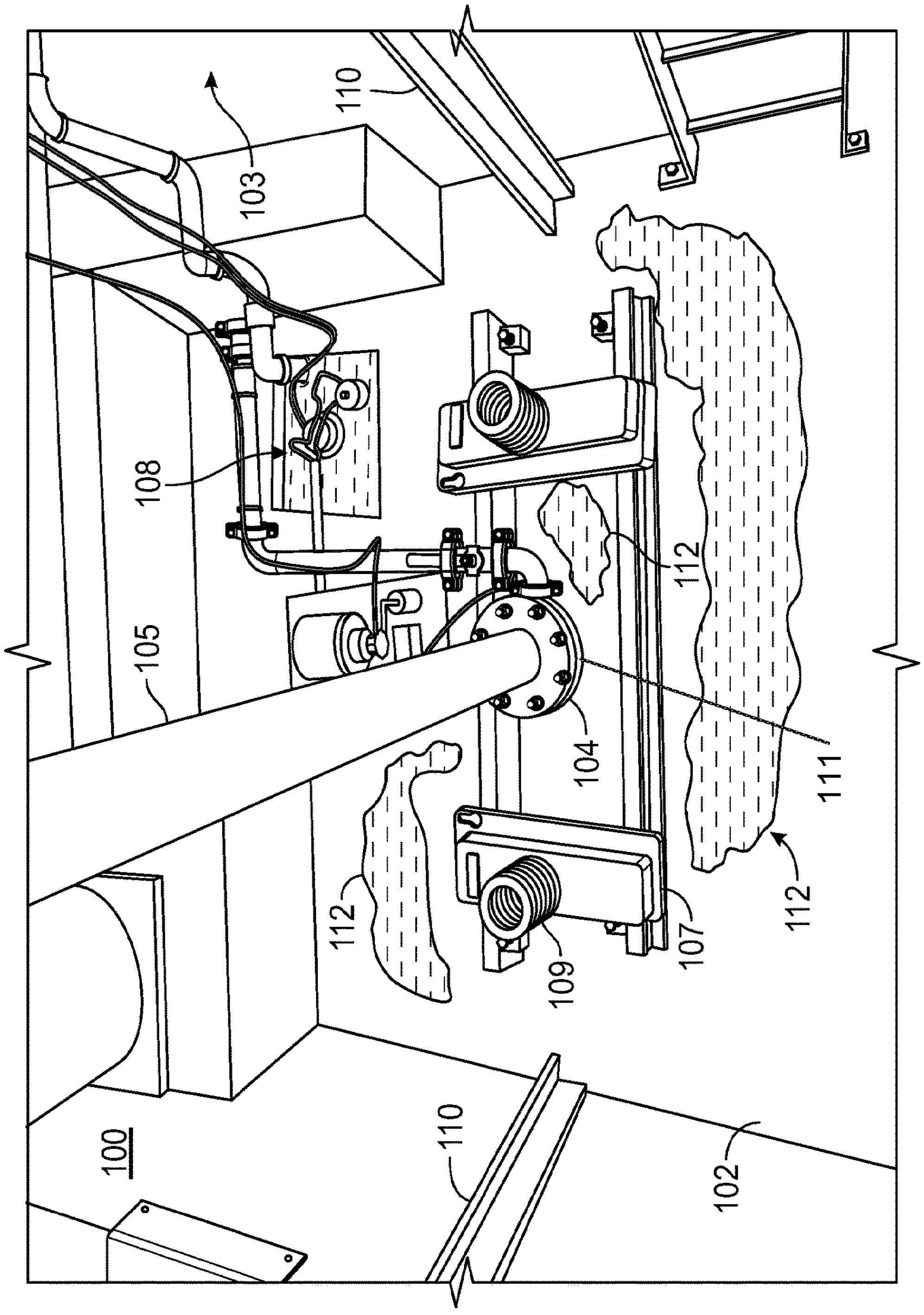
FIG. 1 Prior Art
FIG. 1 depicts a prior art top perspective view of an elevator pit configured with an hydraulic elevator before being repaired by an elevator pit repair method according to an embodiment of the present innovation, in which a bottom flooring surface of the elevator pit having a jack casing and drainage pit installed therein is submerged in water.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION

FIG. 1 depicts a prior art elevator pit 100 having a cement surface or floor 102 circumscribed by at least one wall 103, such as four perpendicular walls generally forming a square or rectangular elevator pit 100, which defines the bottom portion of an elevator shaft through which an elevator car (not shown) selectively moves up and down to selected floors of a building in a well-known manner. The elevator car is supported by an elevator assembly such as a hydraulic jack assembly 104 and is guided between the sidewalls 103 by one or more guide rails 110 extending substantially the length of the elevator shaft. The jack assembly is installed in a well or jack hole which is drilled into the earth in a well-known manner. The jack hole has a diameter that is greater than the diameter of the jack assembly and preferably sized to receive a casing, e.g., steel casing that is inserted in the jack hole to provide stability and maintain the physical conditions of the jack hole. The casing helps prevent collapsing of the jack hole due to shifting of the soil. The hydraulic cylinder 105 is inserted coaxially into the casing, and sand and/or other well-known fillers are provided between the casing and hydraulic cylinder to form an earth casing. An upper end of the steel casing can include an outwardly extending flange or collar 111 that is positioned proximate the ground surface or within the cement floor of the elevator pit to help prevent ground water seepage into the elevator pit 100.

The bottom of the elevator pit 100 includes an elevator buffer assembly 107 which includes a frame with coil springs 109 mounted vertically thereon in a well-known manner. The elevator buffer assembly 107 is a safety device to cushion and stop an elevator car in an unlikely event of slippage or uncontrolled decent. The bottom of the elevator pit 100 further includes a drainage pit 108 to collect liquids 112, e.g., ground water, that seeps into the elevator pit, as well as any hydraulic fluid or other fluids which may collect on the bottom surface 102 of the elevator pit. The bottom surface 102 can be pitched towards the drainage pit 108 so that liquids can flow into the drainage pit 108 from the bottom surface 102. A sump pump or the like is provided in the drainage pit 108 to expel the undesirable fluids from the drainage pit upon filling to a predetermined level. The bottom surface 102 can be slightly pitched towards the drainage pit 108 to enhance drainage of the liquids. Although the present innovation is described for an elevator pit with a hydraulic system, such elevator system is not considered limiting, as the method for waterproofing a bottom surface of an elevator floor pit can be implemented for other types of elevator systems such as, for example, traction elevator systems, machine room less (MRL) elevator systems, and the like.

Figure 2:
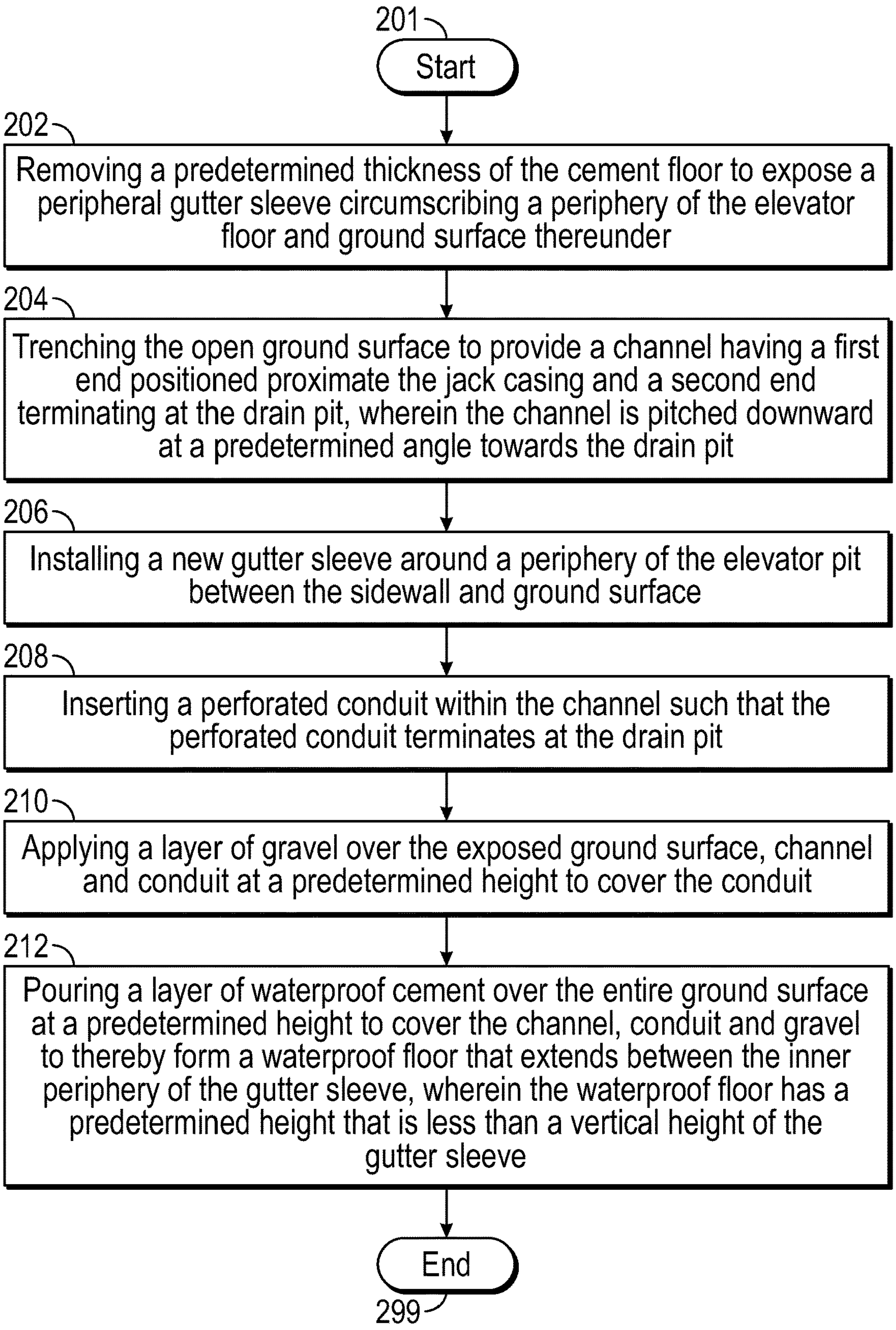
FIG. 2 is a flow diagram of a method of waterproofing an elevator pit, such as the elevator pit of FIG. 1.
Figure 3:
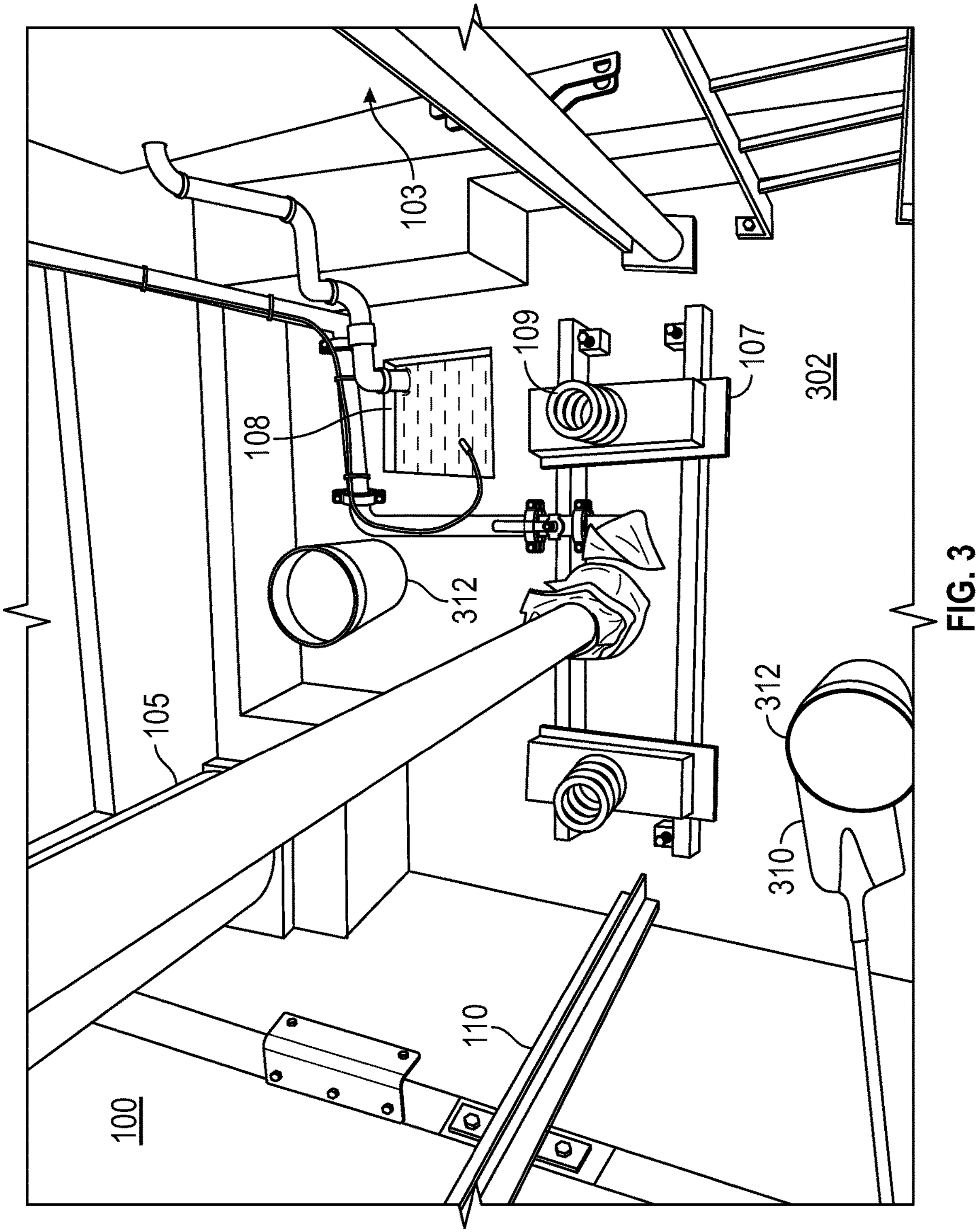
FIG. 3 is a top perspective view of the elevator pit of FIG. 1 undergoing a repair method of FIG. 2 in which the undesirable fluids are drained and the bottom floor surface of the elevator pit is removed.
Figure 4:
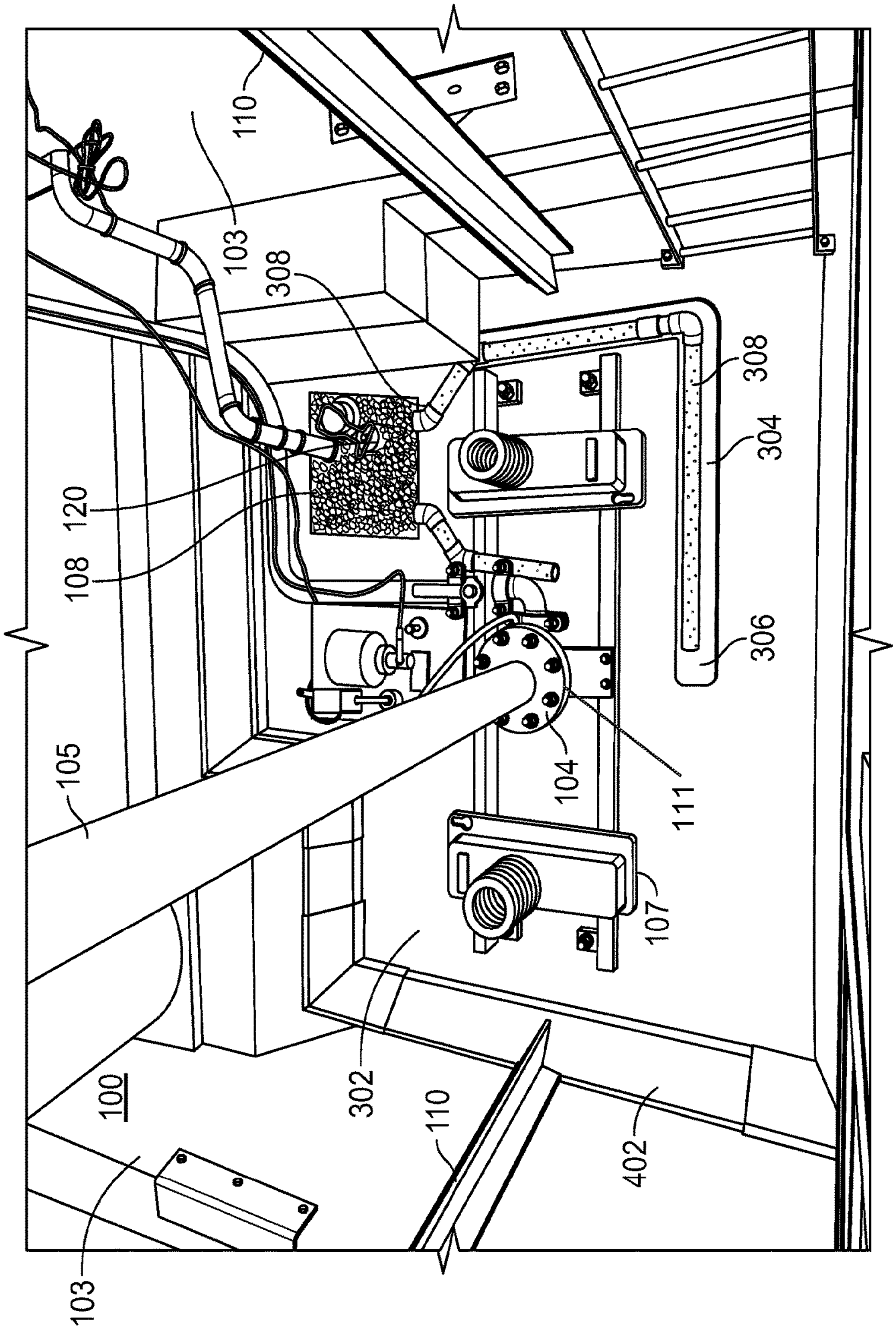
FIG. 4 is a top perspective view of the elevator pit of FIG. 3 undergoing the repair method of FIG. 2 in which one or more conduits are installed in trenches that are excavated between the jack casing and the drainage pit.

Referring to FIG. 2, a flow diagram is illustratively shown for a method 200 of waterproofing an elevator pit 100 having a cement floor 102 through which a jack casing/assembly 104 is installed and a drainage pit 108 is formed. The jack assembly is installed in a jack hole (not shown) formed within the periphery of the elevator pit 100. FIGS. 3-7 are illustrations of an elevator pit depicting the various steps in the flow diagram of FIG. 2. Although the elevator pit is described as including a jack assembly, such type of assembly is not considered limiting, as a person of ordinary skill in the art will appreciate that other elevator assemblies which are required and/or assist in the lifting and lowering of the elevator car can be implemented in the elevator pit 100.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. Moreover, not all illustrated acts may be required to implement a methodology in accordance with the innovation.

The method 200 begins at step 201, where measurements are taken to determine the quantities of materials required to conduct the waterproofing steps of the elevator pit 100. The method 200 proceeds to step 202, where in one embodiment the bottom surface of the elevator pit 100 is excavated to remove at least a portion of the cement flooring, if present. Preferably three to four inches of the entire cement flooring is removed, as illustratively shown in FIG. 3. In another embodiment in which the cement floor slab is six inches or less, predetermined portions of the bottom surface can be excavated until the ground surface therebelow is exposed. For thicker slabs (e.g., 12-36 inches), a trench is formed in the pit cement floor slab to accommodate a drainage conduit as discussed below in further detail. The excavation can be performed using power tools, such as a jack hammer, chisel and the like and/or hand tools in a well-known manner. The excavated debris and fragments of the cement floor are removed from the elevator pit 100 for disposal, e.g., manually using shovels 310 and buckets 312 and the like in a well-known manner.

At step 204, the exposed ground surface 302, which can be comprised of soil, gravel, additional concrete and the like, is trenched to provide a channel 304 having a first end 306 positioned proximate an area susceptible to accumulating fluids/moisture, such as by the jack casing 104 and a second end 308 which terminates into the drainage pit 108. The channel is preferably trenched 3-4 inches deep and wide to accommodate a perforated drainage conduit. Alternatively, where the cement floor slab is a thicker slab, e.g., 8 or more inches deep, the upper surface of the cement floor is trenched, e.g., 4-6 inches deep and wide into the slab to form the channel. The channel 304 is preferably pitched downward at a predetermined angle towards the drainage pit 108, as illustratively shown in FIG. 4. The debris from the trench and/or floor excavation is removed from the elevator pit 100 and the method proceeds to step 206.

Figure 5A:
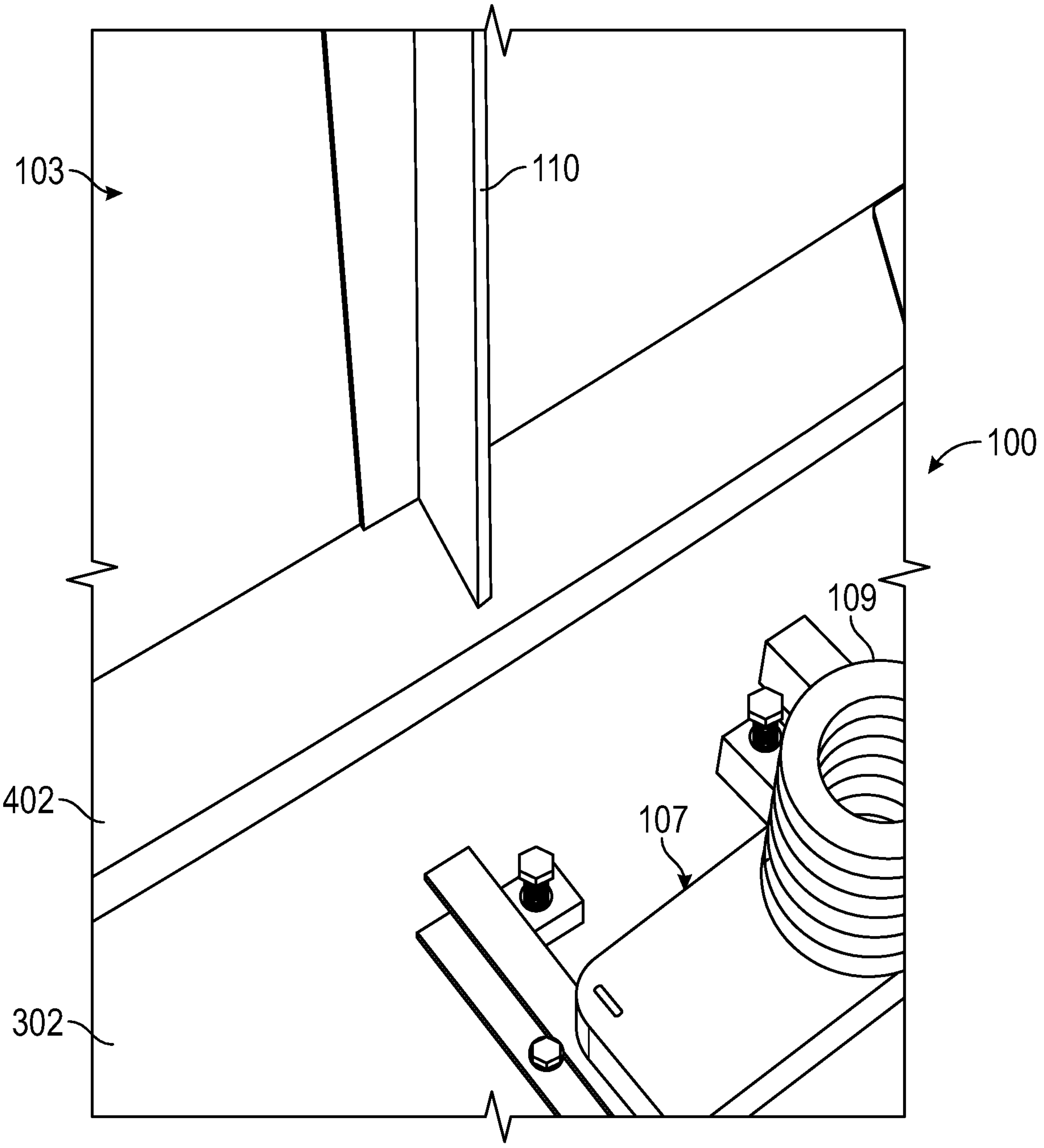
FIGS. 5A and 5B depict top perspective views of the elevator pit having a gutter sleeve installed about the periphery of the elevator pit and suitable for the repair method of FIG. 2.
Figure 5B:
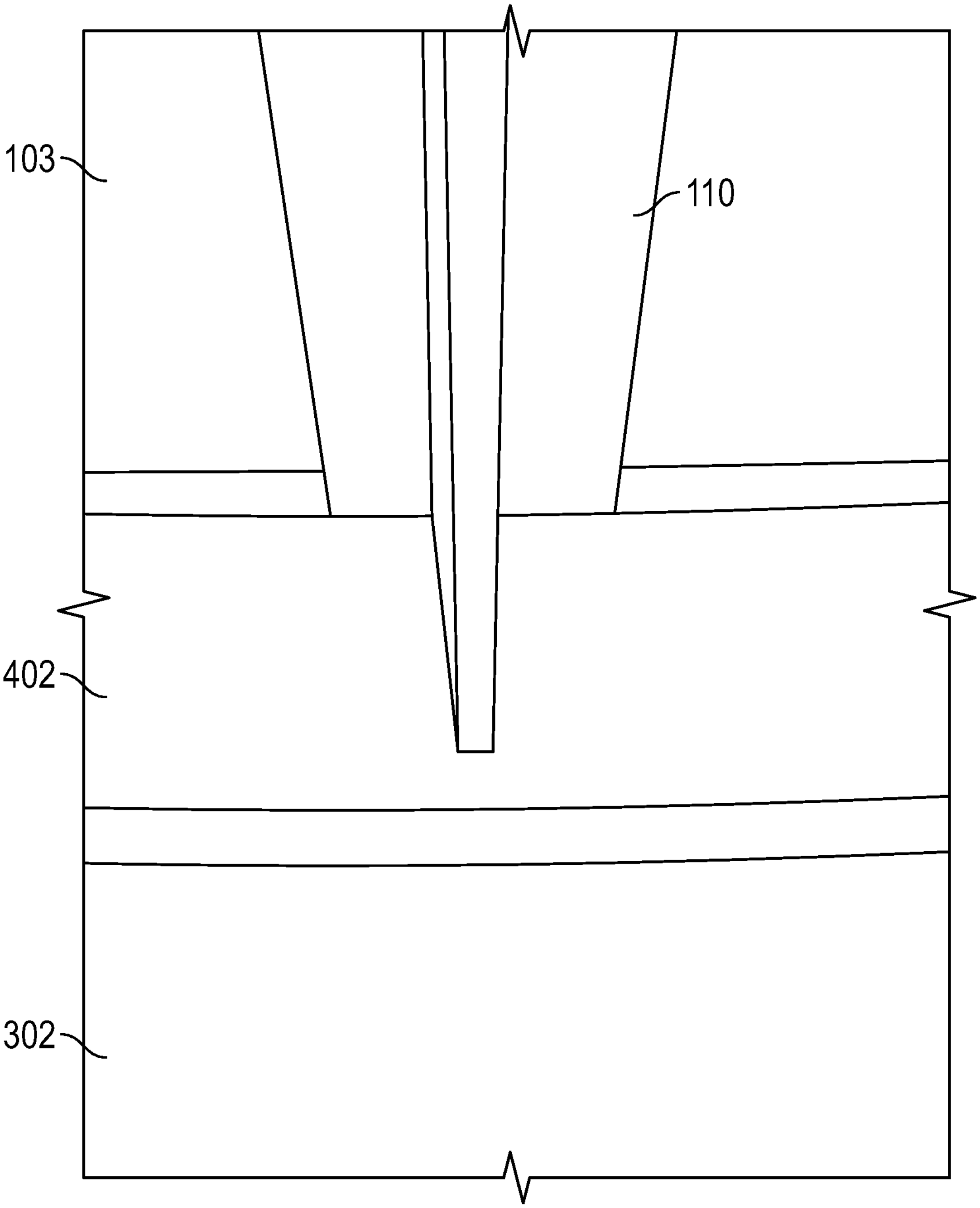

At step 206, in an instance where the entire cement floor was excavated in step 204, a gutter sleeve 402 can be optionally installed along the periphery of the elevator pit 100 against the sidewall 103 over ground surface 302 thereof, as shown in FIGS. 5A and 5B. The gutter sleeve 402 is preferably sloped downwardly from the sidewall 103 to ground surface 302 at an angle in a range of 50 to 70 degrees, although such angles are not considered limiting. The gutter sleeve 402 can be fabricated from a non-porous material that is resistant to corrosion, such as aluminum, stainless steel and the like, although such materials are not considered limiting. The gutter sleeve 402 protects the interface between the sidewall 103 and the floor of the elevator pit 100 from exposure to fluids and the inwardly angled slope directs any fluids towards the center of the floor to enable drainage into the drainage pit 108.

At step 208, a perforated conduit 312 is inserted within the channel 304 such that each perforated conduit terminates at the drainage pit 108. The channel 304 is preferably trenched a depth and width which is greater than the diameter of the perforated conduit 312. For example, if a two-inch diameter conduit 312 is being installed in the ground surface 302, the channel 304 can be trenched to a depth and width of approximately three to four inches, although such dimensions are not considered limiting. The perforated conduit 312 is preferably pitched in the trench 304. Preferably, the perforated conduit 312 is pitched an ⅛ inch to ½ inch per foot, depending on the length of the conduit, although such pitch level is not considered limiting. The perforated conduit 312 can be shaped with angles and elbows to follow the path of the channel 304 from an area proximate the jack casing 104 at least to the edge of the drainage pit 108. Although the channel and conduit are discussed in terms of a path extending from in vicinity of the jack casing 104 into the drainage pit 108, such path(s) is not considered limiting as other areas of the elevator pit flooring can include channel/conduit paths to drain other flooring areas which are susceptible to liquid accumulation into the drainage pit 108. A person of ordinary skill in the art will understand how to measure, cut and connect one or more segments of the conduit 312 for insertion into the channel 304. Although a single channel 304 and corresponding conduit 312 is discussed herein between the jack casing 104 and drainage pit 108, such quantity is not considered limiting. For example, multiple spaced-apart channels 304 and corresponding conduits 312 can be provided, as illustratively shown in FIG. which shows two channels 304 each having a perforated conduit 312 installed in the elevator pit ground surface 302.

Preferably, the perforated conduit 312 is fabricated from polyvinylchloride, although such material is not considered limiting, as other tubing or conduit material can be used such as, for example, copper, brass and the like. The perforations of the conduit 312 are provided and configured to allow fluids (water) to enter into the conduit and flow along the conduit length so as to exit into the drainage pit 108. The conduit 312 can be prefabricated with sufficient openings/perforations or they can be formed in a solid-wall conduit by drilling a series of spaced-apart holes through the sidewall of the conduit using, for example, a power drill and bit. Preferably, the perforations are circular having a diameter in the range of ⅜ to ⅝ inches, although such dimension is not considered limiting. The number of perforations per foot can be in a range of 6 to 12 perforations/foot, although such quantity of perforations is not considered limiting. A person of ordinary skill in the art will appreciate that the number of perforations and their size should be sufficient to allow the undesirable liquids to enter and flow through the conduit towards the drainage pit 108 with minimal loss back into the surrounding environment. Once the perforated conduit 312 is cut and laid into the channel 304, the method 200 proceeds to step 210.

Figure 6:
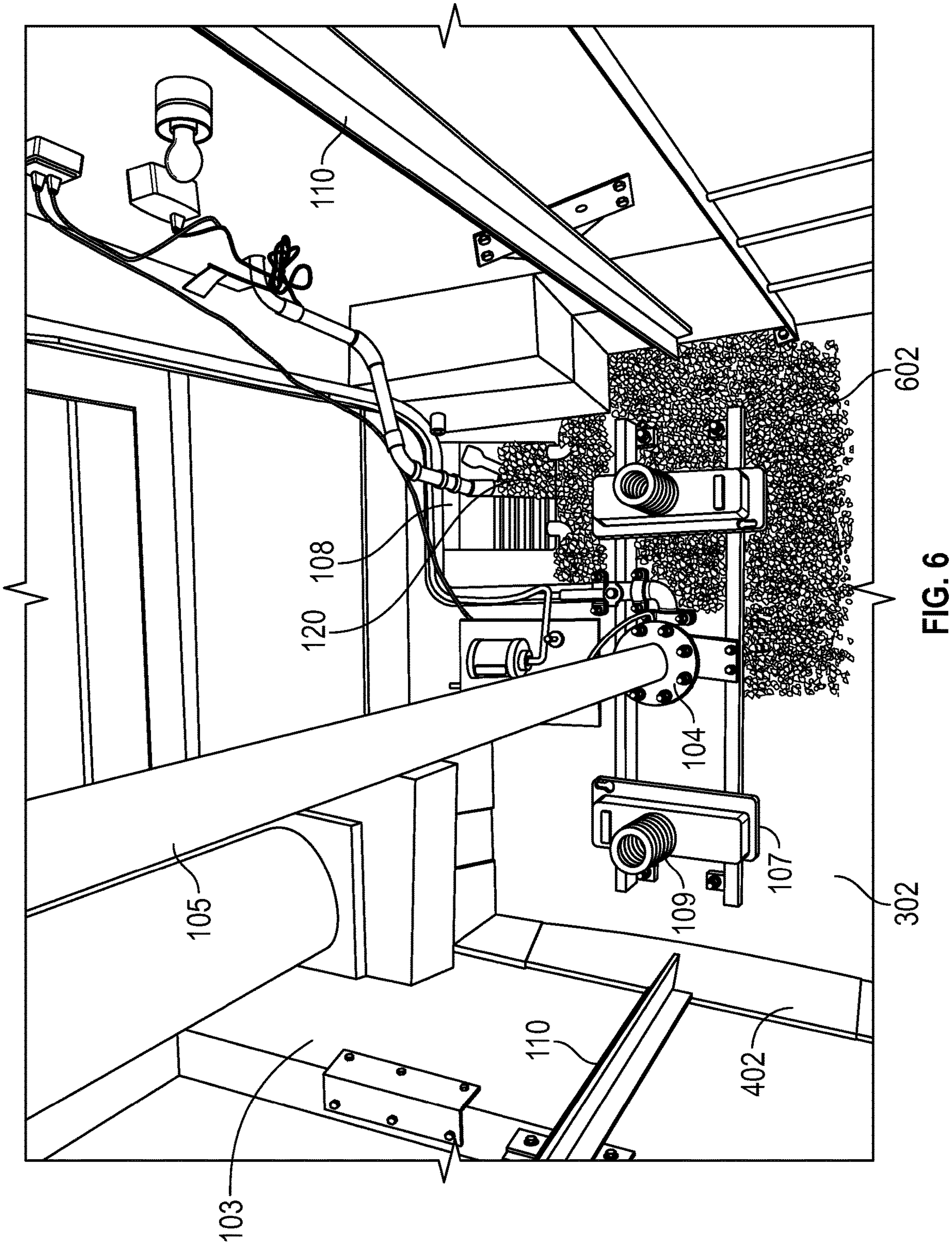
FIG. 6 is a top perspective view of the elevator pit of FIG. 4 undergoing the repair method of FIG. 2 in which a layer of gravel is provided over the one or more conduits and trenches.

At step 210, a layer of gravel 602 is provided over the channel 304 (and ground surface 302 if exposed) and perforated conduit 312 at a predetermined height to cover ground surface 302 (if previously exposed), channel 304 and perforated conduit 312, as illustratively shown in FIG. 6. The gravel 602 provides support and filling around the conduit 312 within the channel 304, while enabling the unwanted fluids to flow between the gravel/stones and into the perforations of the conduit 312, as discussed above. The thickness or height of the gravel 602 can be between ½ to ¾ inches, although such thickness is not considered limiting. Preferably, the type of gravel that overlays the channel 304, perforated conduit 312 and exposed ground surface 302 is pea gravel, bluestone chips and the like, although such types of gravel are not considered limiting. The shape and size of the gravel 602 is greater than the size of the perforations in the conduit to prevent clogging/blockages thereof. The shape of the gravel 602 is preferably circular or rough, although such shapes are not considered limiting. A granularity of the gravel 602 can be in a range of 8-16 millimeters, although such types of gravel and granularity are not considered limiting. The method then proceeds to step 212.

Figure 7:
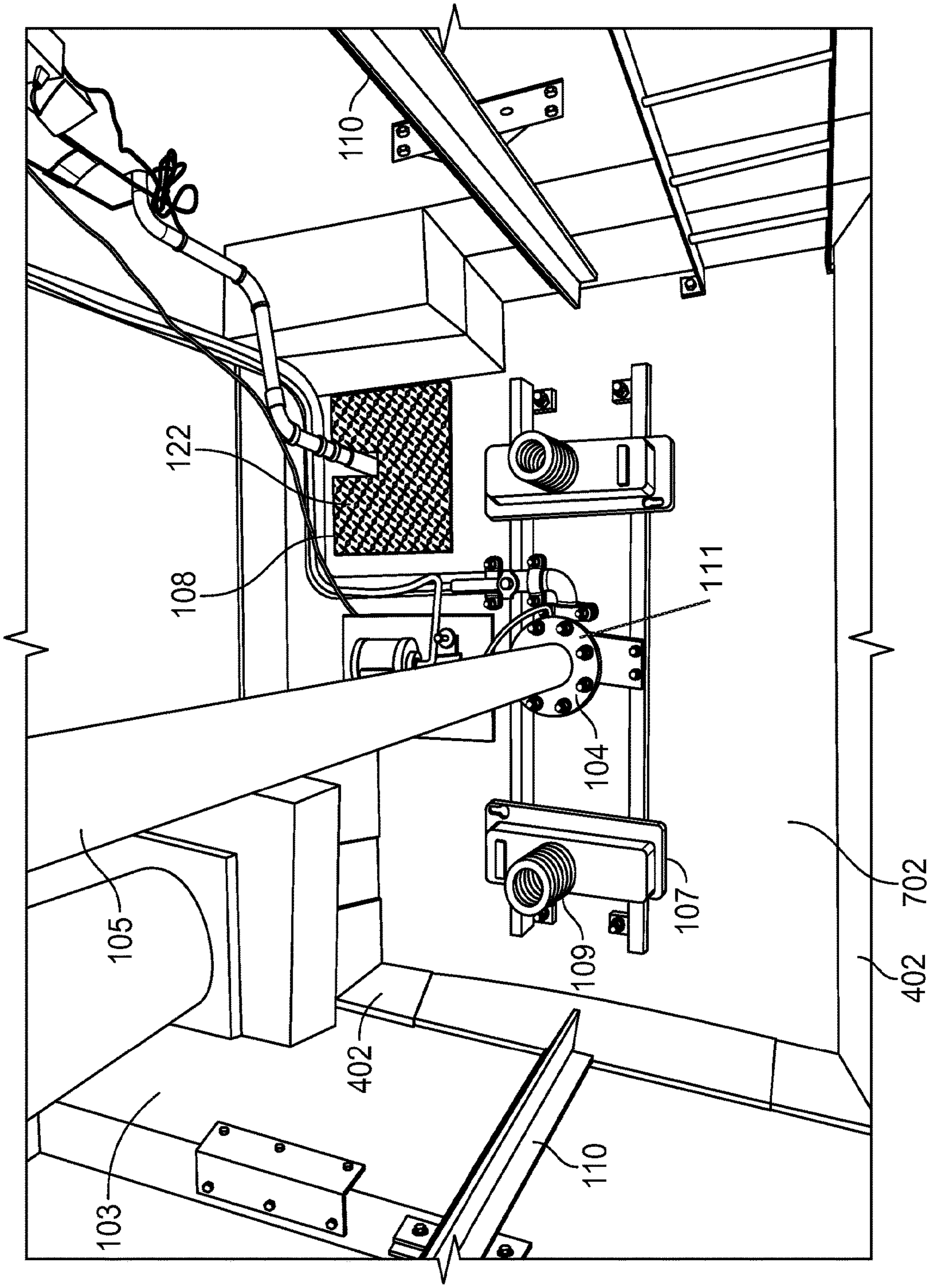
FIG. 7 is a top perspective view of the elevator pit of FIG. 6 undergoing the repair method of FIG. 2 in which a layer of waterproofing cement is provided over the entire floor of the elevator pit.

At step 212, a layer of waterproof cement is poured over the trenched channel 304, gravel 602 and perforated conduit 312 to seal the cement floor. The height of the poured cement is preferably level with the surrounding pre-existing cement floor. Alternatively, where the entire pre-existing cement floor was excavated and removed, a layer of waterproof cement is poured over the entire ground surface at a predetermined height to cover the channel, conduit and gravel to form a waterproof floor 702 that extends to the inner periphery of the gutter sleeve 402 as shown in FIG. 7. In an embodiment where the gutter sleeve 402 is installed, the waterproof floor 702 has a predetermined thickness or height that is less than the vertical height of the gutter sleeve 402. The waterproof cement can be made from mortar, WATERSTOP, XYPEX and the like, although such types of waterproof cement are not considered limiting.

As shown in the figures, a sump pump 120 or other commercially available pump is provided in the drainage pit 108 with a conduit that enables the fluid accumulated in the drainage pit 108 to be pumped out through the sidewall 103 of the elevator pit 100 and routed away from the building structure in a well-known manner. A grate or other covering 122 can be mounted over the drainage pit 108 to prevent larger debris from entering and potentially clogging the pump 120. Once the waterproof cement cures/hardens, the method proceeds to step 299 where the method 200 ends and the elevator pit 100 is available for access/operation with minimal susceptibility to water accumulation on the top surface of the cement floor 702.

The inventive method helps ensure that undesired water or other liquids that may accumulate on or beneath the cement floor of an elevator pit. The novel channel having a perforated conduit routes excess water on and beneath the cement floor of the elevator pit to the drainage pit, to help alleviate degradation to the pit flooring and the structural elevator components in the elevator pit. Advantageously, the present invention helps maintain the integrity, longevity and safe operation of the building structure and elevator system.

While the foregoing is directed to embodiments of the present innovation, other and further embodiments and advantages of the innovation can be envisioned by those of ordinary skill in the art based on this description without departing from the basic scope of the innovation, which is to be determined by the claims that follow.

What is claimed is:

1. An elevator pit having a waterproof cement floor, the elevator pit comprising:

at least one sidewall defining an enclosed space that is sufficient to house an elevator car, and a cement floor extending transversely across an entirety of the enclosed space, the cement floor having a thickness of at least twelve inches;

an elevator assembly extending through the cement floor and which is configured and arranged to raise and lower the elevator car, the cement floor having an upper portion and a lower portion, wherein the lower portion is exposed by excavation of an entirety of the upper portion of the cement floor;

a drainage pit provided in the cement floor;

a gutter sleeve installed against and circumscribing a lower interior surface of the at least one sidewall and over a periphery of the lower portion of the cement floor;

a trench formed in the lower portion of the cement floor and defining a channel having a first end positioned at an area that is susceptible to liquid accumulation within the elevator pit and a second end terminating at the drainage pit, the channel having a depth that is less than a thickness of the lower portion of the cement floor;

a perforated conduit extending within the channel, wherein an end of the perforated conduit terminates at the drainage pit;

a layer of gravel disposed in the channel at a predetermined height to cover the perforated conduit; and a layer of waterproof cement provided at a predetermined height over an entirety of the lower portion of the cement floor and against the gutter sleeve to cover a lower portion of the gutter sleeve, the gravel, the channel and the perforated conduit to form the waterproof cement floor of the elevator pit.

2. The elevator pit of claim 1, wherein the perforated conduit is pitched downward at a predetermined angle towards the drainage pit.

3. The elevator pit of claim 1, wherein a portion of the gutter sleeve extends above the waterproof cement floor.

4. The elevator pit of claim 1, wherein the perforated conduit comprises PVC piping.

5. The elevator pit of claim 1, wherein the gravel has a granularity in a range of approximately ½ to ¾ inches.

6. A method of waterproofing an elevator pit having at least one sidewall forming an enclosed space sufficient to house an elevator car, a cement floor extending transversely across an entirety of the enclosed space and through which an elevator assembly is installed and a drainage pit is provided, wherein the elevator assembly is configured and arranged to raise and lower the elevator car, and wherein the cement floor of the elevator pit has a thickness of at least twelve inches, the method comprising:

excavating an entirety of an upper portion of the cement floor to expose a lower interior surface of the at least one sidewall and a remaining portion of the cement floor which extends across the entirety of the enclosed space;

installing a gutter sleeve against the lower interior surface of the at least one sidewall and over a periphery of the remaining portion of the cement floor; and pouring a layer of waterproof cement at a predetermined height over the entirety of the remaining portion of the cement floor and against the gutter sleeve to cover a lower portion of the gutter sleeve to form a waterproof cement floor covering in the elevator pit.

7. The method of claim 6, wherein the step of pouring the layer of waterproof cement comprises pouring the waterproof cement to a predetermined height that is less than a maximum vertical height of the gutter sleeve.

8. The method of claim 6, wherein the step of excavating an entirety of an upper portion of the cement floor includes removing a depth of three to four inches across the entire upper portion of the cement floor of the elevator pit.

9. The method of claim 6, wherein the step of pouring the waterproof cement includes pouring a layer of waterproof cement of approximately 2 to 4 inches over the remaining portion of the cement floor.

10. A method of waterproofing an elevator pit having at least one sidewall forming an enclosed space sufficient to house an elevator car, a cement floor having a thickness of at least twelve inches and extending transversely across an entirety of the enclosed space formed by the at least one sidewall and through which an elevator assembly is installed and a drainage pit is provided, wherein the elevator assembly is configured and arranged to raise and lower the elevator car, and wherein the cement floor has been subjected to or is susceptible to damage from unintended fluid leakage, the method comprising:

excavating an entire upper portion of the cement floor to expose a lower interior surface of the at least one sidewall and a remaining portion of the cement floor which extends across the entirety of the enclosed space;

installing a gutter sleeve against an entire lower interior surface of the at least one sidewall and over a periphery of the remaining portion of the cement floor;

trenching a channel in the remaining portion of the cement floor, the channel having a depth that is less than a thickness of the remaining portion of the cement floor and a first end positioned at an area susceptible to liquid accumulation within the elevator pit and a second end terminating at the drainage pit;

inserting a perforated conduit within the channel such that an end of the perforated conduit terminates at the drainage pit;

applying a layer of gravel within the channel at a predetermined height to cover the perforated conduit; and pouring a layer of waterproof cement at a predetermined height over an entirety of the remaining portion of the cement floor and against the gutter sleeve to cover a lower portion of the gutter sleeve, the channel, the gravel, and the perforated conduit to form a waterproof cement floor covering in the elevator pit.

11. The method of claim 10, wherein the step of inserting the perforated conduit comprises pitching the perforated conduit downward at a predetermined angle towards the drainage pit.

12. The method of claim 10, wherein the step of inserting the perforated conduit includes installing a conduit having perforations that are in a range of ⅜ to ⅝ inches.

13. The method of claim 10, wherein the step of inserting the perforated conduit includes installing a conduit having a quantity of perforations in a range of 6 to 12 perforations per foot.

14. The method of claim 10, wherein the step of applying a layer of gravel includes laying gravel having a granularity in a range of ½ to ¾ inches.

15. The method of claim 10, wherein the step of applying the layer of gravel includes laying at least one of pebbles and bluestone chips over the channel and conduit.

16. The method of claim 10, wherein the step of pouring the waterproof cement includes pouring a layer of waterproof cement of approximately 2 to 4 inches over the remaining portion of the cement floor.

17. The method of claim 10, wherein the step of excavating an entire upper portion of the cement floor comprises removing a depth of three to four inches across the entire upper portion of the cement floor of the elevator pit.

18. The method of claim 10, wherein the step of pouring the layer of waterproof cement comprises pouring the waterproof cement to a predetermined height that is less than a maximum vertical height of the gutter sleeve.

19. The method of claim 10, wherein the step of pouring the layer of waterproof cement comprises leveling the layer of poured waterproof cement.

20. The method of claim 10, wherein the step of pouring the layer of waterproof cement comprises pitching the layer of poured waterproof cement towards the drainage pit.

* * * * *